H. BERKELE.
WASH-BASIN.
No 180,188. Patented July 25, 1876.
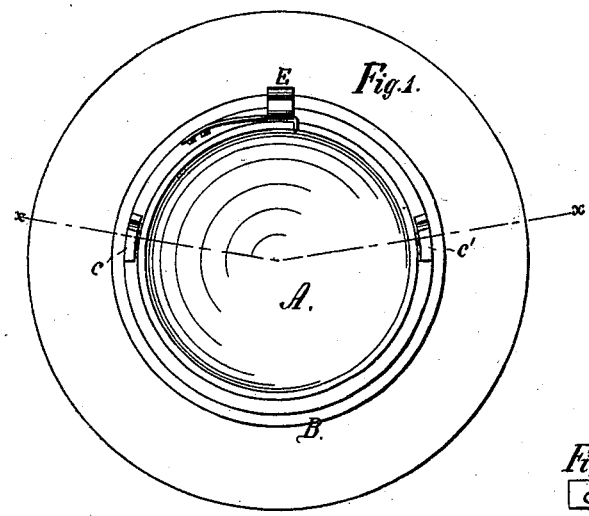
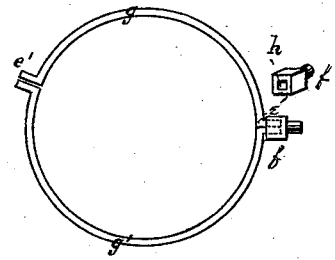
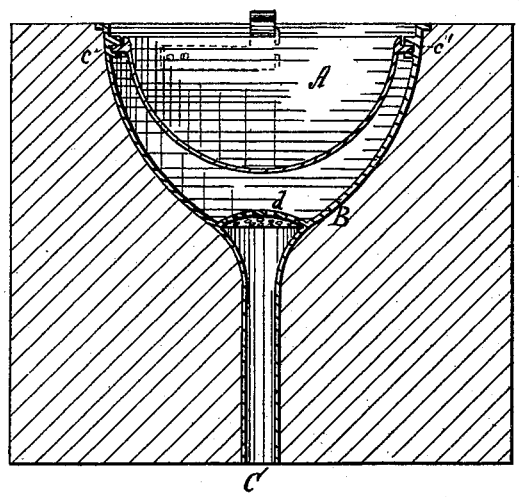
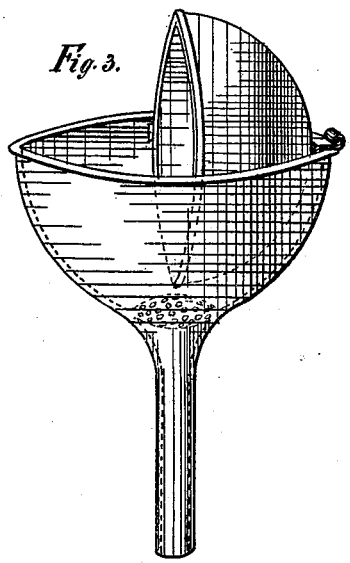
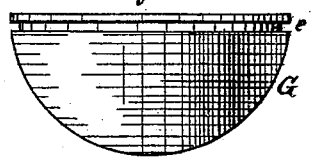
Witnesses:
Inventor:
Henry Berkele
By his Atty.

UNITED STATES PATENT OFFICE.

HENRY BERKELE, OF NEW YORK, N. Y.

IMPROVEMENT IN WASH-BASINS.

Specification forming part of Letters Patent No. 180,188, dated July 25, 1876; application filed April 28, 1876.

*To all whom it may concern:*

Be it known that I, HENRY BERKELE, of the city, county, and State of New York, have invented a new and useful Improvement in Wash-Basins, of which the following is a specification, reference being had to the accompanying drawings, forming part of the same, in which—

Figure 1 is a top view or plan of a wash-basin containing my invention. Fig. 2 is a central vertical section on line *x x* of Fig. 1. Fig. 3 is a perspective view of the same. Fig. 4 is a side view of a porcelain basin. Fig. 5 is a top view of a clamp or sectional ring to be used with the porcelain basin, and Fig. 6 is a side view of one of the ears in which the said basin has its bearings.

My invention relates to a wash-basin designed specially as a fixture, as commonly used in connection with a water-supply, from which water is delivered into the basin through a stop-cock provided with an exterior receptacle, the said basin being of somewhat less diameter than the exterior receptacle, and so placed that water flowing over its rim will fall into the said opening between the two, and suspended on bearings, upon which it may be tipped or turned over, so as to discharge its contents over its rim into the exterior receptacle, said receptacle being provided with an opening and discharge-pipe, from which its contents may flow off; and consists, first, in the combination, with said basin, of a spring-catch, whereby the same is locked in position when hanging level on its bearings, and readily released when it is desired to tilt or tip it to discharge the water into the outer receptacle; and, second, in the combination, with the basin, of the devices hereinafter particularly described, whereby the trunnions constituting the bearings are secured to the basin.

A is the wash-basin, and B the exterior receptacle, the latter being a fixture, with an opening in the bottom into the discharge-pipe C. The aperture may be covered with a strainer, *d*, made of perforated metal or wire-cloth. The basin is provided with journals *c c'* near its rim, upon which it swings freely. They are preferably a little off the diametrical center, as seen in Fig. 1, so that the basin, when left free, will tilt on its journals, whereby the rim on the outside, being thrown up above the rim of the outer receptacle B, may be conveniently taken hold of by the hand to tip the basin into the position seen in Fig. 3 to discharge its contents.

The journals *c c'* have their bearings in ears or lugs *d'*, secured to the receptacle B, and so located that the rim of the basin, when in place, will be somewhat below the rim of the receptacle B, so that any overflow from the basin must necessarily fall into the receptacle. Fig. 5 represents the form of the ears or lugs in which are the bearings of the journals *c c'*. This permits the basin to be readily removed and replaced in position, while, when in position, it will not be displaced by tilting.

E represents a spring-catch, secured to the receptacle B, which engages the laterally-projecting rim of the basin, and thus holds it in position, as seen in Fig. 1. By pulling back the spring the basin is disengaged, and permitted to tilt or swing upon its journals.

The catch of the form represented and described I recommend as convenient and cheap; but a spring-catch of any suitable form and construction for the purpose may be employed.

If it is desired to use a porcelain basin in place of a metal one, a convenient form of one adapted to my invention is represented in Fig. 4. The said porcelain basin G is made with a groove, *e*, around the outer surface near the rim, as shown, and the journals are formed on a metal band made in two sections, *g g'*, as shown in Fig. 5. These sections clamp the basin within the groove *e*, and meet at their ends on opposite sides of the basin, where their ends *e' e'* are turned outward at right angles.

*h* are the journal-pieces, formed with recesses or openings at their inner ends and the journal-bearings on their outer ends. The ends *e' e'* of the band are inserted in the recesses of the said journal-pieces, and secured by rivets or screws. The sections of the band are thus held together upon the basin, and may be detached at pleasure, the journal-pins *h* serving the double purpose of journal and the means of fastening the band *e'* upon the basin.

I am aware that wash-basins have been set on bearings within an exterior receptacle, so that water overflowing from the basin would fall into such receptacle. I do not claim, broadly, such a combination or arrangement.

What I do claim as my invention, and desire to secure by Letters Patent, is—

1. The combination, with the wash-basin A, suspended on bearings in the receptacle B, of a spring-catch, whereby the basin is locked in position when hanging level on its bearings, and readily unlocked at pleasure, as and for the purpose described.

2. The combination, with the basin G, provided with a groove, $e$, of the sectional band $e'$ and the journal-pieces $h\ h'$, as and for the purpose specified.

Witness my hand this 24th day of April, 1876.

HENRY BERKELE.

Witnesses:
W. A. HULBUT,
JOSEPH MERWIN.